(12) United States Patent
Nam

(10) Patent No.: US 6,584,583 B2
(45) Date of Patent: Jun. 24, 2003

(54) METHOD AND APPARATUS FOR RESTORING DATA DAMAGED BY A COMPUTER VIRUS ON A MAGNETIC INFORMATION RECORDING DISK IN A HARD DISK DRIVE

(75) Inventor: Hye-Jeong Nam, Kwangmyong-shi (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/219,519

(22) Filed: Dec. 23, 1998

(65) Prior Publication Data

US 2002/0152333 A1 Oct. 17, 2002

(30) Foreign Application Priority Data

Dec. 31, 1997 (KR) .......................................... 97-80560

(51) Int. Cl.[7] .............................................. G06F 11/00
(52) U.S. Cl. .............................. 714/42; 714/5; 714/54; 714/45; 714/764; 710/13; 711/162
(58) Field of Search ........................... 714/42, 2, 6, 48, 714/54, 764, 768, 3, 11, 60, 5, 7, 40, 43, 44, 45, 773; 709/301; 710/13, 74; 711/162

(56) References Cited

U.S. PATENT DOCUMENTS

| | | | | |
|---|---|---|---|---|
| 5,086,502 A | * | 2/1992 | Malcolm | 395/575 |
| 5,274,807 A | * | 12/1993 | Hoshen et al. | 395/650 |
| 5,349,655 A | | 9/1994 | Mann | |
| 5,367,682 A | | 11/1994 | Chang | |
| 5,408,642 A | * | 4/1995 | Mann | 395/575 |
| 5,421,006 A | * | 5/1995 | Jablon et al. | 395/575 |
| 5,432,927 A | | 7/1995 | Grote et al. | |
| 5,509,120 A | | 4/1996 | Merkin et al. | |
| 5,537,540 A | | 7/1996 | Miller et al. | |
| 5,559,960 A | | 9/1996 | Lettvin | |
| 5,651,139 A | | 7/1997 | Cripe et al. | |
| 5,657,470 A | | 8/1997 | Fisherman et al. | |
| 5,675,725 A | * | 10/1997 | Malcolm | 713/200 |
| 5,684,875 A | | 11/1997 | Ellenberger | |
| 5,721,877 A | | 2/1998 | Heflinger et al. | |
| 5,799,147 A | | 8/1998 | Shannon | |
| 5,802,277 A | * | 9/1998 | Cowlard | 713/200 |
| 5,948,110 A | * | 9/1999 | Hitz et al. | 714/6 |
| 5,960,460 A | * | 9/1999 | Marasco et al. | 711/162 |
| 5,966,732 A | * | 10/1999 | Assaf | 711/170 |
| 6,073,239 A | * | 6/2000 | Dotan | 713/200 |
| 6,122,734 A | * | 9/2000 | Jeon | 713/2 |
| 6,178,536 B1 | * | 1/2001 | Sorkin | 714/766 |
| 6,205,527 B1 | * | 3/2001 | Goshey et al. | 711/162 |

FOREIGN PATENT DOCUMENTS

KR    1997-0071693    11/1997

OTHER PUBLICATIONS

Notification of the Reasons for Rejection issued by the Korean Intellectual Property Office on the 31st of Aug. 2000 in co-pending parent application No. 10–1997–0080560.

* cited by examiner

*Primary Examiner*—Jeffrey Gaffin
*Assistant Examiner*—Rijue Mai
(74) *Attorney, Agent, or Firm*—Robert E. Bushnell, Esq.

(57) ABSTRACT

In a technique for restoring data damaged by a computer virus on a magnetic information recording disk in a hard disk drive, booting information required to boot the hard disk drive and file position information indicating the position of a file when data is stored in a file unit are backed up in a predetermined portion of a maintenance area on the disk. The booting information or the file position information is restored based on the backed up information when the booting information or the file position information is infected with the computer virus.

20 Claims, 3 Drawing Sheets

METHOD AND APPARATUS FOR RESTORING DATA DAMAGED BY A COMPUTER VIRUS ON A MAGNETIC INFORMATION RECORDING DISK IN A HARD DISK DRIVE

CLAIM OF PRIORITY

This application makes reference to, incorporates the same herein, and claims all benefits accruing under 35 U.S.C. §119 from an application for METHOD OF RESTORING DATA DAMAGED BY VIRUS IN HARD DISK DRIVE earlier filed in the Korean Industrial Property Office on the 31$^{st}$ of December 1997 and there duly assigned Ser. No. 80560/1997.

BACKGROUND OF THE INVENTION

1. Field of the Invention

The present invention relates to a hard disk drive, and in particular, to a technique for restoring data damaged by a computer virus in a hard disk drive.

2. Description of the Related Art

In a hard disk drive widely used as an auxiliary memory device for a computer system by virtue of its high data storage capacity, data is magnetically recorded on a magnetic disk (referred to as a disk, hereinafter). The hard disk drive has been increasingly used as personal computers (PCS) have proliferated.

Along with the increased provision and use of computers, viral damages have been increased, including loss of stored data or shut-down of a computer system by a computer virus (hereinafter, referred to as a virus).

More specifically, a virus is a kind of software program which operates in a memory and is stored in a file like a general program. The virus gives rise to many problems such as changing or erasing an existing file or the structure of a system, damaging data, destroying program files by re-formatting a hard disk, and locking up a computer. It also reproduces itself in another disk or computer.

A disk is infected with a virus by copying a virus-infected file or simply by looking over the directory of the file in some cases.

To restore such a virus-infected disk, a so-called vaccine program has emerged for removal of the virus and recovery of damaged data. However, the kinds of viruses are increasing due to the increased use of computers, and the viruses act more tactfully. Under these circumstances, it is impossible to cope with the viruses with vaccine programs for protecting data against viral damages.

The following patents each discloses features in common with the present invention but do not teach or suggest the specifically recited technique for restoring data damaged by a virus in a hard disk drive in accordance with the present invention: U.S. Pat. No. 5,799,147 to Shannon, entitled Computer Recovery Backup Method, U.S. Pat. No. 5,349,655 to Mann, entitled Method For Recovery Of A Computer Program Infected By A Computer Virus, U.S. Pat. No. 5,432,927 to Grote et al., entitled Fail-Safe EEPROM Based Rewritable Boot System, U.S. Pat. No. 5,367,682 to Chang, entitled Data Processing Virus Protection Circuitry Including A Permanent Memory For Storing A Redundant Partition Table, U.S. Pat. No. 5,721,877 to Heflinger et al., entitled Method And Apparatus for Limiting Access To Nonvolatile Memory Device, U.S. Pat. No. 5,657,470 to Fisherman et al., entitled Personal Computer Hard Disk Protection System, U.S. Pat. No. 5,651,139 to Cripe et al., entitled protected System Partition Read/Write Access On A SCSI Controlled DASD, U.S. Pat. No. 5,509,120 to Merkin et al., entitled Method And System For Detecting Computer Viruses During Power On Self Test, U.S. Pat. No. 5,421,006 to Jablon et al., entitled Method And Apparatus For Assessing Integrity Of Computer System Software, U.S. Pat. No. 5,684,875 to Ellenberger, entitled Method And Apparatus For Detecting A Computer Virus On A Computer, U.S. Pat. No. 5,559,960 to Lettvin, entitled Software Anti-Virus Facility, and U.S. Pat. No. 5,537,540 to Miller et al., entitled Transparent, Secure, Computer Virus Detection Method And Apparatus.

SUMMARY OF THE INVENTION

An object of the present invention is to provide for restoring data damaged by a virus in a hard disk drive.

Another object of the present invention is to provide a technique for restoring a system and a file recorded on a disk, which can not be booted and read, respectively, due to the virus.

Still another object of the present invention is to provide a data restoring technique which can protect user data and increase the reliability of a hard disk drive by reducing rapidly increasing viral damages.

To achieve the above objects, there is provided a technique for restoring data damaged by a computer virus on a magnetic information recording disk in a hard disk drive. Booting information required to boot the hard disk drive and file position information indicating the position of a file when data is stored in a file unit are backed up in a predetermined portion of a maintenance area on the disk. The booting information or the file position information is restored based on the backed up information when the booting information or the file position information is infected with the computer virus.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail. While details such as a storing method of a file allocation table (FAT) are disclosed, they are mere exemplary applications for comprehensive understanding of the present invention. Thus, it is clearly understood that many modifications can be made to these details by anyone skilled in the art within the scope and spirit of the present invention.

Figure 1:
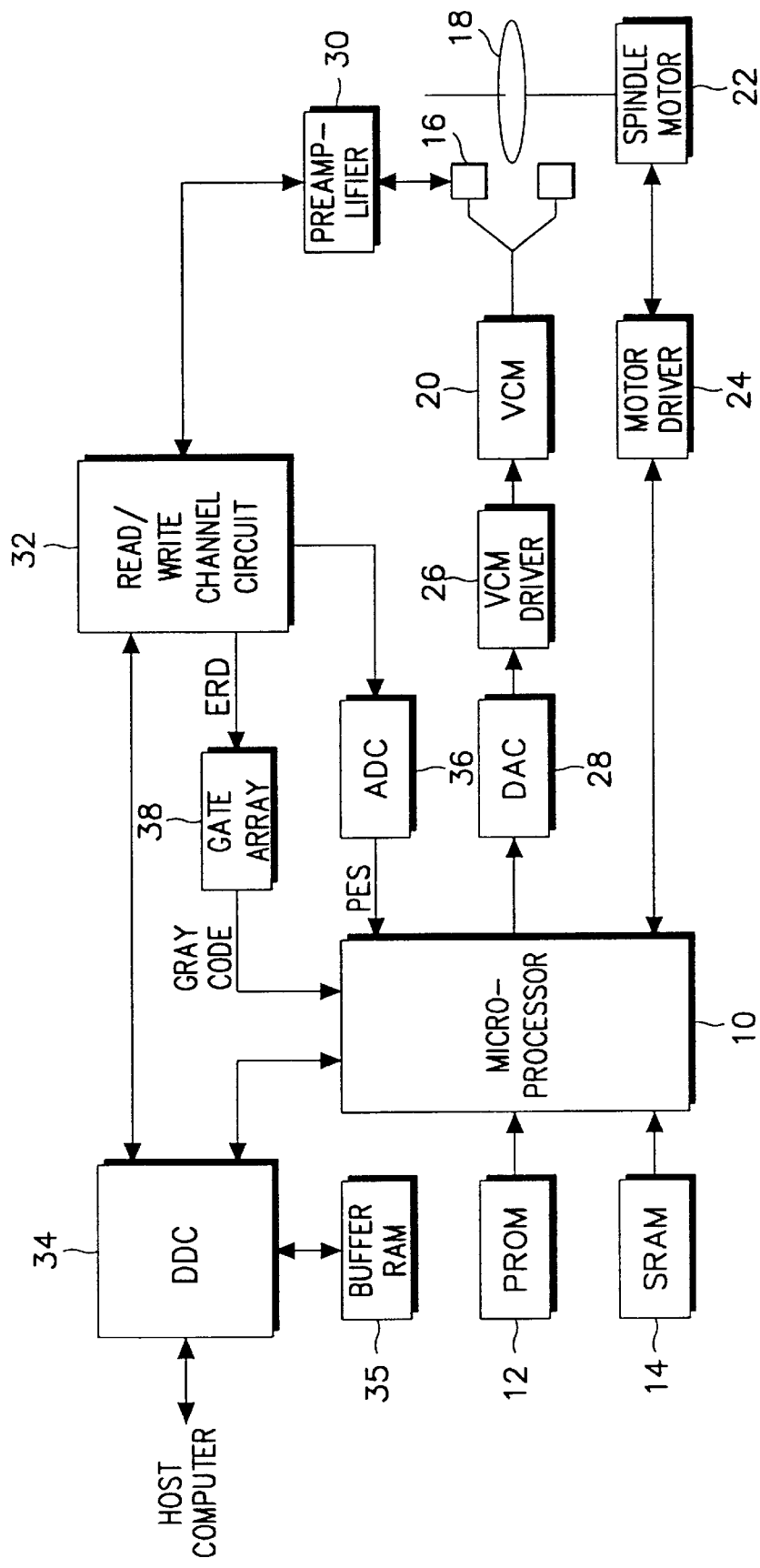
FIG. 1 is a block diagram of a hard disk drive to which the present invention is applied.

The operation of a hard disk drive will be first described. FIG. 1 is a block diagram of a hard disk drive to which the present invention is applied. Referring to FIG. 1, a microprocessor 10 is connected to a PROM (Programmable Read Only Memory) 12 for storing a specific control program and data of the microprocessor 10, and an SRAM (Static Random Access Memory) 14, and controls all the operations of the HDD. A head 16, fixed at an end of an actuator, horizontally flies over a rotating disk 18 being a recording medium between an inner side and an outer side of the disk 18, for writing or reading data on or from the disk 18. A VCM (Voice Coil Motor) 20, positioned at the other end of the actuator, drives the head 16 according to the level and direction of a current supplied to the VCM 20. A spindle motor 22 rotates the disk 18 stacked around a driving shaft according to a control signal received from a motor driver 24. A VCM driver 26 is connected to the VCM 20 and controls the driving of the VCM 20. A DAC (Digital-to-Analog Converter) 28, connected to the microprocessor 10 and the VCM driver 26, receives a digital control signal from the microprocessor 10, converts the received signal to an analog signal, and outputs the analog signal to the VCM driver 26.

The motor driver 24 is connected to the spindle motor 22 and the microprocessor 10, for controlling the driving of the spindle motor 22 under the control of the microprocessor 10. A preamplifier 30 is connected to the head 16, preamplifies a reproduced signal, and outputs an input write signal to the head 16. A read/write channel circuit 32 is connected to the microprocessor 10, the preamplifier 30, and a DDC (Disk Data Controller) 34, receives write data from the DDC 34, encodes the write data, and outputs the encoded write data to the preamplifier 30 under the control of the microprocessor 10. The read/write channel circuit 32 converts an analog reproduction signal received from the preamplifier 30 to a digital signal, and outputs the digital signal as encoded read data ERD. An ADC (Analog-to-Digital Converter) 36 is connected to the read/write channel circuit 32, receives an analog servo reproduction signal from the read/write channel circuit 32, converts the received signal to a digital position error signal PES, and outputs the signal PES to the microprocessor 10. A gate array 38 is connected to the read/write channel circuit 32, receives the signal ERD, detects servo information such as a gray code in a servo area of the disk 18, and outputs the detected servo information. The DDC 34 has a sequencer for operating according to a microprogram downloaded from the microprocessor 10, and records data received from an external data input device (e.g, a host computer) on the disk 18 via the read/write channel circuit 32 and the preamplifier 30. The DDC 34 also reads the data from the disk 18 and transmits the read data to the external data input device. The DDC 34 interfaces communication between the host computer and the microprocessor 10, and temporarily stores data transmitted between the host computer and the microprocessor 10 and between the host computer and the read/write channel circuit 32 in a buffer RAM 35.

The microprocessor 10 for controlling the operation of the disk drive controls the DDC 34 in response to a read or write instruction received from the host computer, and controls track seek and track following. The PROM 12 stores the operation program of the microprocessor 10 and various designated values.

The microprocessor 10 in the hard disk drive as constituted above implements a program of restoring data damaged by a virus, stored in the PROM 12 according to the feature of the present invention.

According to the feature of the present invention, the microprocessor 10 backs up data which will cause serious problems if it is damaged by a virus among data recorded on the disk 18, that is, system booting information and an FAT including the titles and positions of recorded data files in a maintenance area inaccessible to a general user, which will be described in more detail referring to the attached drawings.

Figure 2:
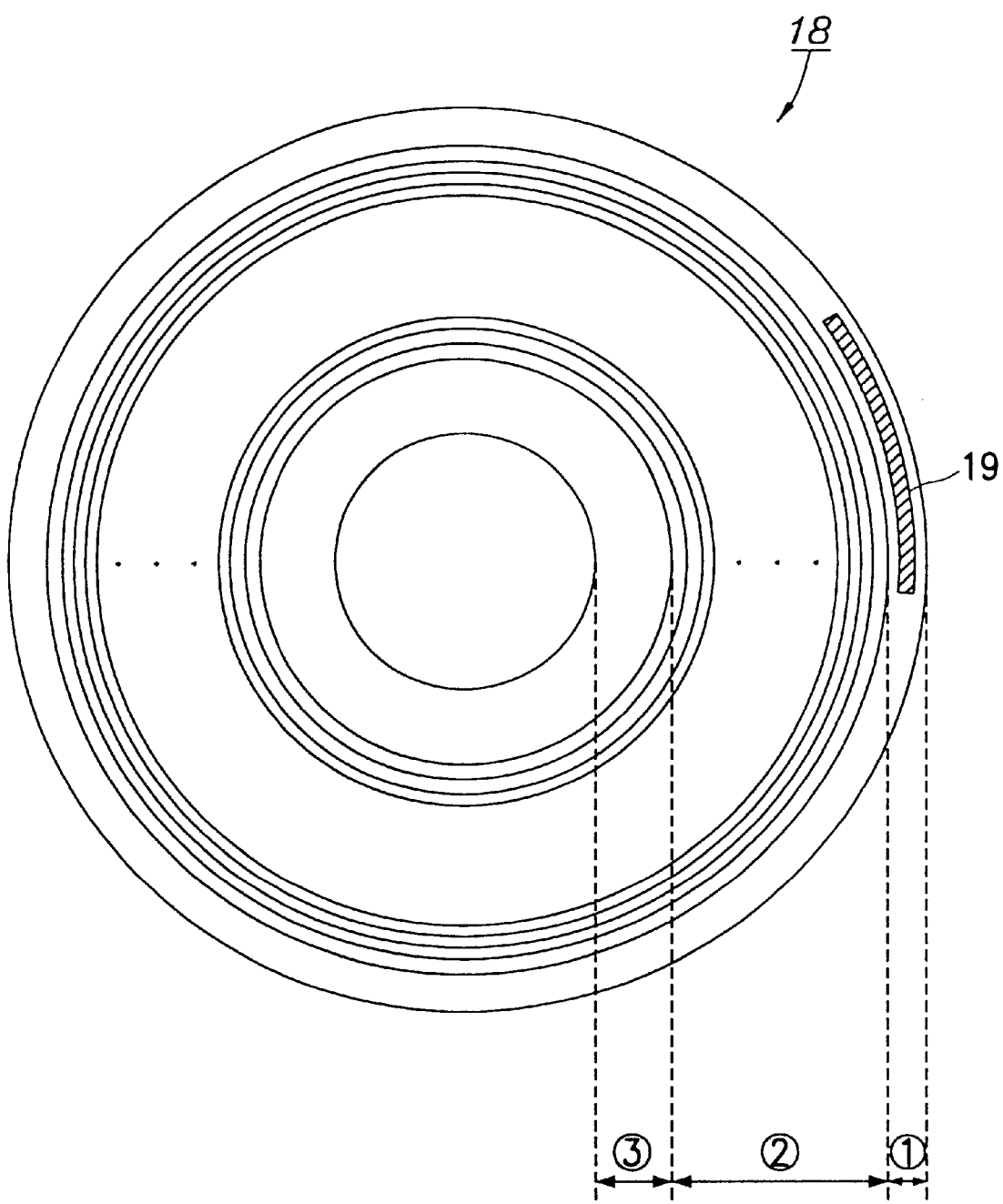
FIG. 2 is an exemplary format diagram of an information recording disk shown in FIG. 1.

FIG. 2 is a format diagram of a general information storing disk 18 divided into several areas. Referring to FIG. 2, the disk 18 is largely divided into a system area ①, a data area ②, and a parking zone ③.

The system area ①is also called a maintenance area inaccessible to a general user, for storing system data and data used to repair and maintain a hard disk drive. The data area ② is accessible to the general user, for storing general user data. The parking zone ③ is the place where a magnetic writing/reading device (i.e., head, not shown) for recording and reading data on and from the disk 18 is parked, and has no data recorded therein.

As for the system area ①, a hard disk drive manufacturer records various pieces of system-related information in the maintenance area ① of a disk, such as the specific number of a drive, fabrication-related information, defect-log-in data, a defect list, or SMART (Self Monitoring Analysis Reporting Technology), and reads them when necessary. Because the information recorded in the maintenance area ① is unique to the drive, it cannot be stored in a ROM and is read out to a RAM of the drive when necessary. One to four tracks are usually assigned to the maintenance area ①.

According to the feature of the present invention, information which is likely to cause serious problems when it is damaged by a virus among pieces of information recorded on the disk 18 is stored beforehand in a predetermined portion 19 of the maintenance area ①. The information may include system booting information and an FAT having the titles and positions of recorded data files. If such information is damaged by a virus, the system cannot be booted. If the position information of a recorded file is damaged, file data cannot be restored even if the system is booted. For these reasons, the system booting information and the FAT become targets of a virus attack. When a data file is damaged by a virus, the file is partially or wholly damaged. However, possible damage of the system booting information and the file position information causes the serious problem that the data of the entire files recorded on a disk is obsolete. Therefore, the booting information and the file position information are backed up in a safe area, that is, the maintenance area, so that existing information can be restored with the backed-up information when it is damaged.

The booting information and the file position information are generally stored in the data area ②, which will be described in detail with reference to the attached drawings.

Figures 3A, 3B:
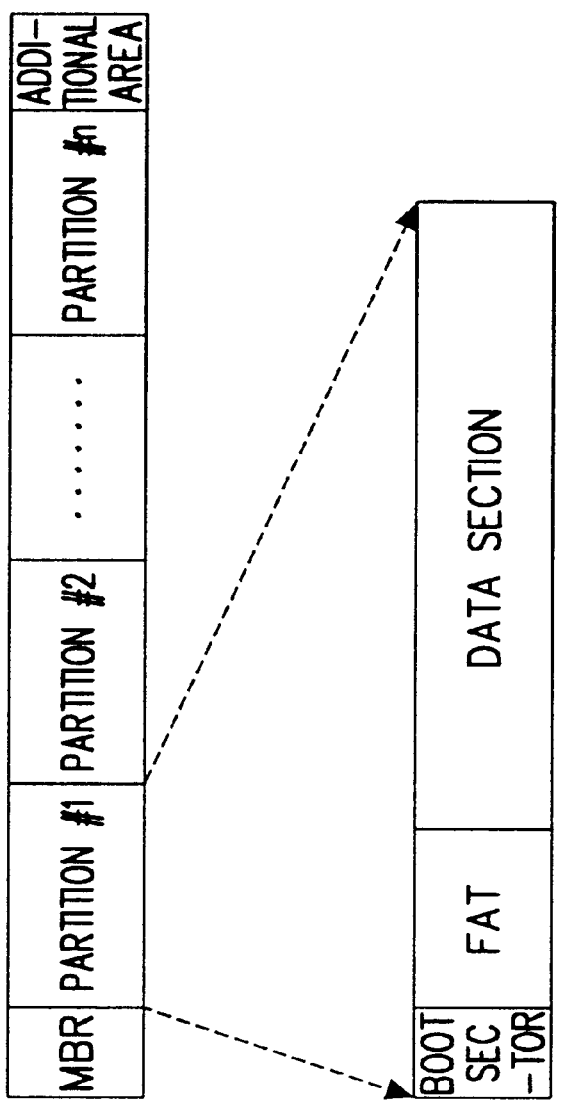
FIGS. 3A and 3B are detailed format diagrams of a data area shown in FIG. 2.

Detailed formats of the data area ② for storing data are shown in FIGS. 3A and 3B. As shown in FIG. 3A, the data area ② is divided into several partitions. This is referred to as partitioning to store at least one operating system in one disk. A partition table having the position of each partition, that is, the starting and ending positions of each partition is generally positioned in sector #1 of cylinder #0 in head #0 usually called MBR (Master Boot Record), as shown in FIG. 3A. The MBR has information of each partition and, especially, information of a partition including a boot program of a present operating system for booting a hard disk drive.

In the DOS (Disk Operating System), the boot program is generally stored in the first sector of the first partition following the MBR, that is, of partition #1 in FIG. 3A.

A detailed format of partition #1 is shown in FIG. 3B. Referring to FIG. 3B, the area having the boot program is generally called a boot sector. The boot sector occupies exactly one sector, and is provided in the first sector of the partition.

When a drive is booted by turning on a computer, the microprocessor 10 sequentially seeks sector #1 of cylinder #0 on head #0 of the disk 18, reads the MBR information stored in the sector, seeks a partition having a boot program, searches for a boot sector of the corresponding partition, reads out the boot program to the SRAM 14, and implements a booting operation. Therefore, information recorded in the MBR and the boot sector is necessary for the booting operation, as described above.

In FIG. 3B, a FAT follows the boot sector and indicates the position of information stored in file units in a data area of the disk 18, from a user's point of view. The FAT also represents information of the data area in a cluster unit being a set of several sectors, and has information of damaged clusters and empty clusters so that it can indicate which empty cluster to use when a new file is recorded and prevent file data from being recorded in a damaged cluster. The FAT is modified when a user stores a new file, changes an existing file, or erases the existing file.

After a drive is manufactured by a drive manufacturer, the above MBR, boot sector, and FAT are backed up in the predetermined portion 19 of the maintenance area ①. The MBR and the boot sector are valid unless the hard disk drive is newly initialized, whereas the FAT is continuously modified. Therefore, the FAT should be updated periodically. In the embodiment of the present invention, the FAT is updated whenever the computer system is turned on. To prevent the FAT stored in the predetermined portion 19 of the maintenance area ① from being updated according to an FAT damaged by a virus, space is prepared beforehand for at least two FATs in the predetermined portion 19 of the maintenance area ①, and the latest FAT and at least one previous FAT can be stored in the space.

If file position information is damaged by a virus or a drive is not booted, a drive manufacturer issues an instruction to the microprocessor 10 to restore an MBR, a boot sector, and an FAT damaged by a virus by means of the MBR and the boot sector stored in the predetermined portion 19 of the maintenance area ①, and an uninfected FAT among several FATs. This instruction is unique to each drive. Upon the instruction, the microprocessor 10 restores data, especially, the MBR, boot sector, and FAT damaged by the virus.

According to the present invention as described above, system booting information and a FAT having the titles and positions of recorded data files, which are likely to cause a serious problem when they are damaged by a virus among various pieces of information recorded on an information recording disk in a hard disk drive, are backed up in a maintenance area inaccessible to a general user for use in restoring system booting information and a FAT when they are infected with a virus. Therefore, rapidly increasing viral damages to a hard disk drive are reduced, user data is protected, and the reliability of the drive is increased.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A process of ameliorating damage to a recording disk by a computer virus, comprising the steps of:

dividing an information recording disk into a maintenance area with limited access to a user, and a data area with general access to the user, with said data area being separate and discrete from said maintenance area;

storing within said maintenance area, a back-up of system information stored within said data area of the recording medium; and after the system information stored within said data area is infected by a computer virus, restoring said system information of the recording medium by using the system information stored within said maintenance area.

2. The process of claim 1, further comprised of positioning said maintenance area on said disk to restrict said access to the user.

3. The process of claim 1, further comprised of said system information comprising booting information required to boot a computer reading information from the recording disk.

4. The process of claim 1, further comprised of said system information comprising file position information indicating a position of a file stored within said data area of the recording disk.

5. The process of claim 1, with said system information comprising file position information indicating a position for each file stored within said data area of the recording disk, said process further comprised of periodically storing within said maintenance area file position information that represents changes in positions of files stored within said data area subsequent to a previous storage of the file position information within said maintenance area.

6. The process of claim 1, with said system information comprising file position information indicating a position for each file stored within said data area of the recording disk, said process further comprised of:

periodically storing within said maintenance area current file position information representing changes in positions of files stored within said data area subsequent to any previous storage of the file position information within said maintenance area; and restoring file position information damaged by a computer virus with said current file position information.

7. A process of ameliorating damage to a recording disk by a computer virus, comprising the steps of:

dividing an information recording disk into a maintenance area with limited access to a user, and a data area with general access to the user, with said data area being separate and discrete from said maintenance area;

storing within said maintenance area, a back-up of booting information required to boot a computer reading information from the recording disk;

storing with said maintenance area a back-up of file position information indicating a position of a file stored within said data area of the recording disk; and after one of the booting information stored within said data area and the file position information stored with said data area is infected by a computer virus, restoring the infected one of said booting information and said file position information by using a corresponding one of the booting information and the file position information stored with said maintenance area.

8. The process of claim 7, further comprised of the booting information comprising a mater boot record and information from a boot sector of the data area.

9. The process of claim 7, further comprised of the file position information comprising a file allocation table of file stored within the data area.

10. The process of claim 8, further comprised of the file position information comprising a file allocation table of file stored within the data area.

11. The process of claim 7, further comprised of the file position information backed up in the maintenance area being updated in a predetermined period in conformity with modifications to positions of files stored within the data area.

12. The process of claim 7, further comprised of periodically storing within said maintenance area file position information that represents changes in positions of files stored within said data area subsequent to a previous storage of the file position information within said maintenance area.

13. The process of claim 7, further comprised of:

periodically storing within said maintenance area current file position information representing changes in positions of files stored within said data area subsequent to any previous storage of the file position information within said maintenance area; and restoring file position information damaged by a computer virus with said current file position information.

14. An apparatus for restoring data stored on an information recording medium that have been damaged by a computer virus, comprising:

an information recording disk comprising a maintenance area with limited access to a user, and a data area with general access to the user, said data area being separate and discrete from said maintenance area; and a circuit accessing said information recording disk to store within said maintenance area, a back-up of system information stored within said data area of the recording medium, and after the system information stored within said data area is infected by a computer virus, restoring said system information of the recording medium by using the system information stored within said maintenance area.

15. The apparatus of claim 14, further comprised of said circuit:

storing with said system information, file position information indicating a position for each file stored within said data area of the recording disk, and periodically storing within said maintenance area file position information that represents changes in positions of files stored within said data area subsequent to a previous storage of the file position information within said maintenance area.

16. The process of claim 14, further comprised of said circuit:

storing with said system information, file position information indicating a position for each file stored within said data area of the recording disk, periodically storing within said maintenance area current position information representing changes in positions of files stored within said data area subsequent to any previous storage of the file position information within said maintenance area, and restoring file position information damaged by a computer virus with said current position information.

17. The apparatus of claim 14, further comprised of said circuit storing with said system information, booting information required to boot a computer reading information from the recording disk.

18. An apparatus for restoring data stored on an information recording medium that have been damaged by a computer virus, comprising:

an information recording disk comprising a maintenance area with limited access to a user, and a data area with general access to the user, said data area being separate and discrete from said maintenance area; and a circuit accessing said information recording disk to store within said maintenance area, a back-up of booting information required to boot a computer reading information from the recording disk, and a back-up of file position information indicating a position of a file stored within said data area of the recording disk, and after one of the booting information and the file position information stored within said data area is infected by a computer virus, restoring the infected said one of said booting information and said file position information of the recording disk by using the corresponding one of the booting information and the file position information stored within said maintenance area.

19. The apparatus of claim 18, further comprised of said circuit:

storing with said system information, file position information indicating a position for each file stored within said data area of the recording disk, and periodically storing within said maintenance area file position information that represents changes in positions of files stored within said data area subsequent to a previous storage of the file position information within said maintenance area.

20. The process of claim 18, further comprised of said circuit:

storing with said system information, file position information indicating a position for each file stored within said data area of the recording disk, periodically storing within said maintenance area current position information representing changes in positions of files stored within said data area subsequent to any previous storage of the file position information within said maintenance area, and restoring file position information damaged by a computer virus with said current position information.

* * * * *